US012705459B2

(12) United States Patent
Xiao

(10) Patent No.: US 12,705,459 B2
(45) Date of Patent: Aug. 11, 2026

(54) MULTI-MODAL DEEP LEARNING OF STRUCTURED AND NON-STRUCTURED DATA

(71) Applicant: ADP, Inc., Roseland, NJ (US)

(72) Inventor: Min Xiao, Florham Park, NJ (US)

(73) Assignee: ADP, Inc., Roseland, NJ (US)

( * ) Notice: Subject to any disclaimer, the term of this patent is extended or adjusted under 35 U.S.C. 154(b) by 1279 days.

(21) Appl. No.: 17/451,272

(22) Filed: Oct. 18, 2021

(65) Prior Publication Data

US 2023/0117247 A1 Apr. 20, 2023

(51) Int. Cl.
*G06N 3/045* (2023.01)
*G06N 20/00* (2019.01)

(52) U.S. Cl.
CPC ............ *G06N 3/045* (2023.01); *G06N 20/00* (2019.01)

(58) Field of Classification Search
None
See application file for complete search history.

(56) References Cited

U.S. PATENT DOCUMENTS 9,497,243 B1 * 11/2016 Binns .................. G06N 3/0499
2003/0020727 A1 * 1/2003 Newman ............. H04N 1/6052
345/604
2019/0370616 A1 * 12/2019 Eser ..................... G06F 18/256
2021/0304001 A1 * 9/2021 Po ........................ G06N 3/0464
2021/0311937 A1 * 10/2021 Bordawekar .......... G06N 3/088
2022/0114417 A1 * 4/2022 Dalli ...................... G06N 3/08
2022/0295095 A1 * 9/2022 Pourreza ................ G06N 3/09

FOREIGN PATENT DOCUMENTS

JP 2021524099 A * 9/2021 ............ G06N 3/084
JP 2021532699 A * 11/2021 .......... H04N 1/6052

* cited by examiner

*Primary Examiner* — Haimei Jiang
(74) *Attorney, Agent, or Firm* — Foley & Lardner LLP

(57) ABSTRACT

A method for multi-modal deep learning is provided. The method comprises receiving input data from a database, wherein the input data comprises different data types. Responsive to receiving the input data, a number of corresponding neural extractors are identified to which to route the input data according to data type. Each neural extractor is specialized in extracting latent representations from a specific data type. The neural extractors, via a number of machine learning models, extract latent representations from the input data. The latent representations are then directed to a number of corresponding neural predictors, wherein each input data type is directed to a modality-specific neural predictor. The neural predictors then generate a number of output predictions for each input data type.

18 Claims, 7 Drawing Sheets

MULTI-MODAL DEEP LEARNING OF STRUCTURED AND NON-STRUCTURED DATA

BACKGROUND INFORMATION

1. Field

The present disclosure relates generally to an improved computer system and, in particular, to deep machine learning utilize both structured and non-structured data to facilitate decision predictions.

2. Background

Machine Learning extracts meaningful insights from raw data to efficiently solve complex, data-rich business problems. Specifically, machine learning algorithms learn from the data iteratively and allow computers to find different types of hidden information.

In practice, the application of machine learning drives business results that can dramatically affect a company's revenue. More and more companies are starting to make decision on data. Machine learning helps to enhance business scalability and improve business operation. When implemented in the right manner, machine learning can serve as a solution to a variety of complex business problems and predict complex customer behaviors. For example, machine learning can be used to predict customer lifetime value, predict maintenance practice, perform quantitative financial analysis, process image recognition, and improve cyber security.

Therefore, it would be desirable to have a method and apparatus that take into account at least some of the issues discussed above, as well as other possible issues. For example, it would be desirable to have a method and apparatus that automate data management process.

SUMMARY

An illustrative embodiment provides a computer-implemented method for multi-modal deep learning. The method comprises receiving input data from a database, wherein the input data comprises different data types. Responsive to receiving the input data, a number of corresponding neural extractors are identified to which to route the input data according to data type. Each neural extractor is specialized in extracting latent representations from a specific data type. The neural extractors, via a number of machine learning models, extract latent representations from the input data. The latent representations are then directed to a number of corresponding neural predictors, wherein each input data type is directed to a modality-specific neural predictor. The neural predictors then generate a number of output predictions for each input data type.

Another illustrative embodiment provides a system for multi-modal deep learning. The system comprises a storage device configured to store program instructions and one or more processors operably connected to the storage device and configured to execute the program instructions to cause the system to: receive input data from a database, wherein the input data comprises different data types; responsive to receiving the input data, identify a number of corresponding neural extractors to which to route the input data according to data type, wherein each neural extractor is specialized in extracting latent representations from a specific data type; extract, by the neural extractors via a number of machine learning models, latent representations from the input data; direct the latent representations to a number of corresponding neural predictors, wherein each input data type is directed to a modality-specific neural predictor; and generate, by the neural predictors, a number of output predictions for each input data type.

Yet Another illustrative embodiment provides a computer program product for multi-modal deep learning. The computer program product comprises a computer-readable storage medium having program instructions embodied thereon to perform the steps of: receiving input data from a database, wherein the input data comprises different data types; responsive to receiving the input data, identifying a number of corresponding neural extractors to which to route the input data according to data type, wherein each neural extractor is specialized in extracting latent representations from a specific data type; extracting, by the neural extractors via a number of machine learning models, latent representations from the input data; directing the latent representations to a number of corresponding neural predictors, wherein each input data type is directed to a modality-specific neural predictor; and generating, by the neural predictors, a number of output predictions for each input data type.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that implementation of machine learning requires massive amounts of data for training as well as time and resources to interpret the data and the analysis. Furthermore, machine learning methods are also highly susceptible to errors if the training data set is small or includes bias, those errors can result a chain of errors that can go undetected for long periods of time.

Illustrative embodiments also recognize and take into account that multi-modality learning has gained more attention in the past few years. The multimodal deep learning combines different types of information for improving performance to a complicated task. For example, in human capital management domain, the data needs to be combined includes HR profiles, historical payroll transactions, service calls, or other analytic reports.

The illustrative embodiments also recognize and take into account that the combined data needs to be effectively utilized to develop a robust intelligent decision agent.

Illustrative embodiments also recognize and take into account that sometimes crucial information is missed and only partial modality is observed when the model is implemented to make decision in the real life scenario application.

Figure 1:
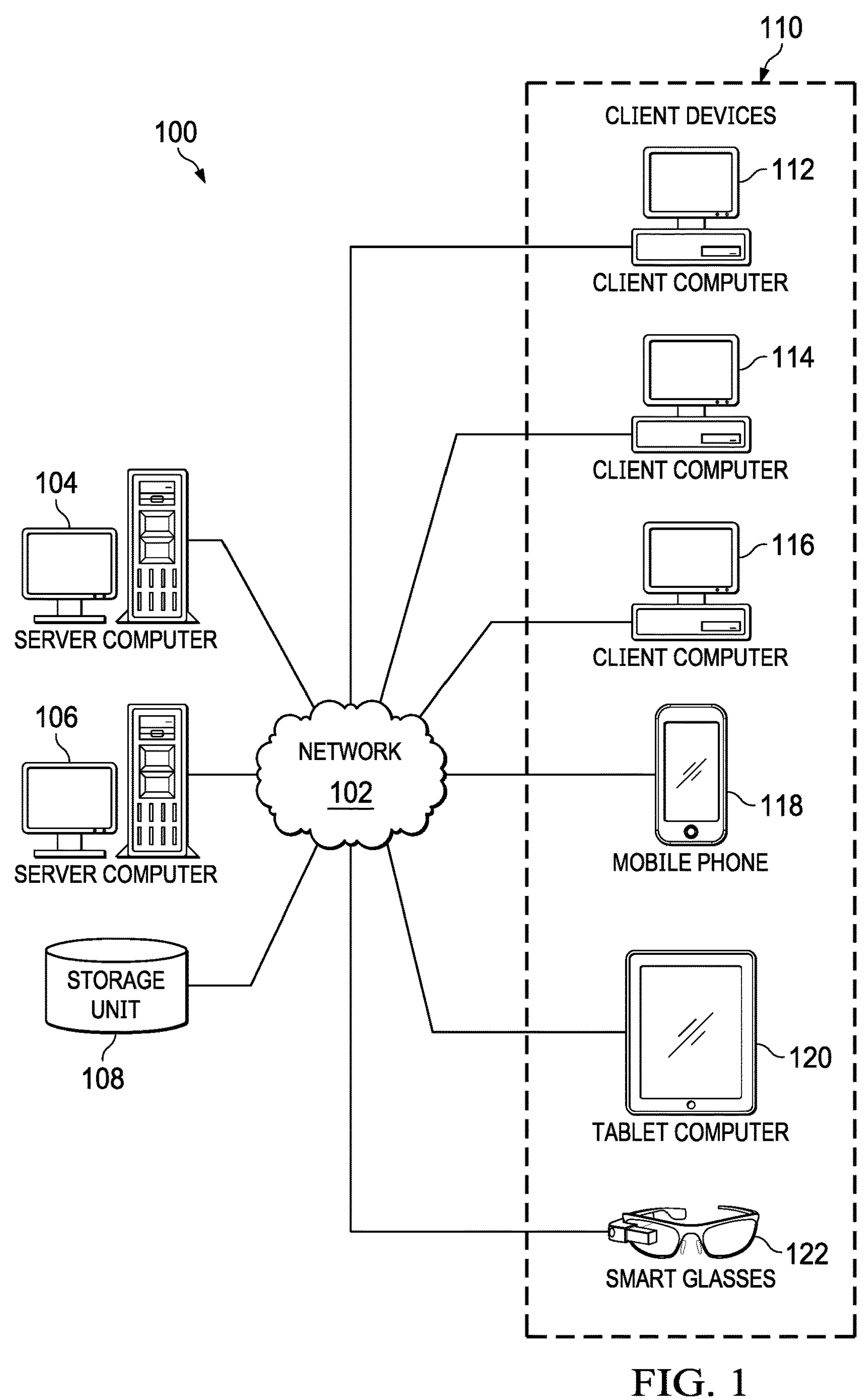
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

The phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

In the illustrative example, a "number of" when used with reference to items means one or more items. For example, a number of different types of networks is one or more different types of networks.

Figure 2:
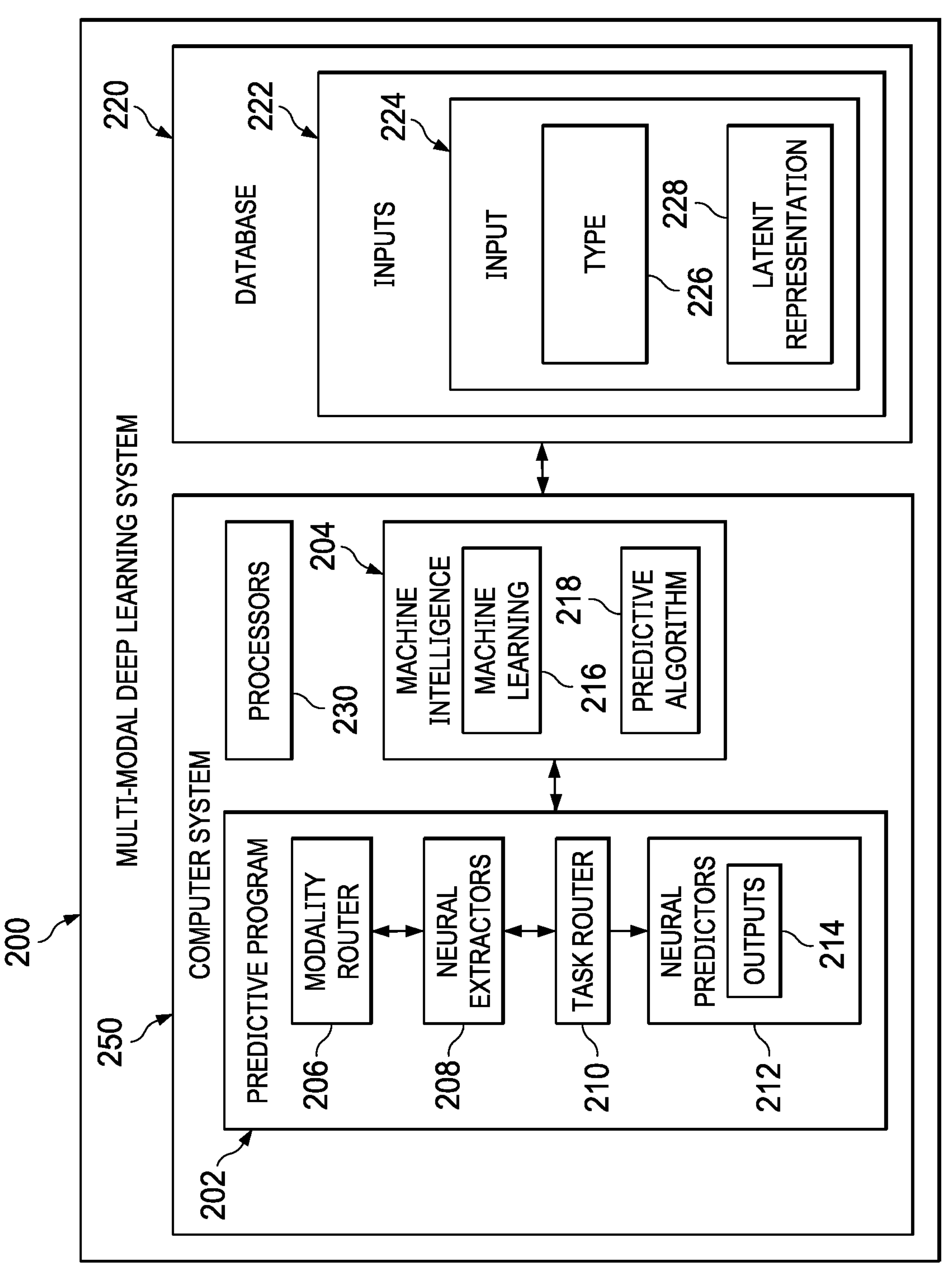
FIG. 2 depicts a block diagram illustrating a multi-modal deep learning system for predictive modeling in accordance with an illustrative embodiment.

Turning to FIG. 2, a block diagram of a multi-modal deep learning system for predictive modeling is depicted in accordance with an illustrative embodiment. Multi-modal deep learning system 200 comprises computer system 250 and database 220. Computer system 250 might be an example of server computer 106 in FIG. 1. Similarly, database 220 might be implemented in storage such as storage unit 108 in FIG. 1.

Computer system 250 comprises a machine intelligence 204 and predictive program 202. Machine intelligence 204 comprises machine learning 216 and predictive algorithms 218.

Database 220 comprises inputs 222. Inputs 222 can be data of various types from various domains and resources. Each input 224 from inputs 222 has a type 226. Types of inputs can also be referred to as different modalities. Examples include text, image, video, or audio data. Inputs 222 can be either structed data or non-structured input. For example, inputs 222 may comprise structured tabular information for employees (e.g., tenure, education background) or employers (e.g., industry/sector, revenue band). Inputs 222 may also comprise time-series information such as, e.g., employee monthly/biweekly pay checks, employer monthly salary payouts, etc. Inputs 222 may also comprise free-text data such as, e.g., employee resumes and descriptive text of a company's expertise. Inputs 222 may also comprise audio and/or transcripts of service calls.

In the human capital management domain, the type of data can be HR profiles, historical payroll transactions, service calls, or other analytic reports. In another illustrative example, in the domain of customer relations, the data type can be the industry or industry sector in which the customer operates, the business partner type that the customer is for the product provider, the number of employees the customer has, geographic location(s), legal jurisdiction(s), revenues, the product bundle the customer in question is using, and the customer's activity using the products features/functions.

In this illustrative example, the input 224 from inputs 222 has information that can be compressed into a latent representation 228 by using machine learning 216. The latent representation 228 includes lower dimension information that represents the key feature of input 224. In this illustrative example, the machine learning 216 might use a classic encoder-decoder architecture to extract the latent representation 228 of input 224. The encoder of machine learning 216 identifies the similar data within the input 224 and encodes the information using fewer dimensions than the original representation to produce a latent representation 228 in the form of a vector. The redundant information that has less analytic value are removed from the input 224 when generating latent representation 228. In this manner, only important features are then studied and analyzed by the machine learning 216. In some illustrative examples, the latent representation 228 can be used by a decoder to reconstruct the input 224. The reconstruction of the latent representation 228 can be used to test the accuracy of encoder of machine learning 216.

Machine intelligence 204 can be implemented using one or more systems such as an artificial intelligence system, a neural network, a Bayesian network, an expert system, a fuzzy logic system, a genetic algorithm, or other suitable types of systems. Machine learning 216 and predictive algorithms 218 can make computer system 250 a special purpose computer for dynamic predictive modelling.

In an embodiment, processors 230 comprises one or more conventional general-purpose central processing units (CPUs). In an alternate embodiment, processors 230 comprises one or more graphical processing units (GPUs). Though originally designed to accelerate the creation of images with millions of pixels whose frames need to be continually recalculated to display output in less than a second, GPUs are particularly well suited to machine learning. Their specialized parallel processing architecture allows them to perform many more floating-point operations per second then a CPU, on the order of 100× more. GPUs can be clustered together to run neural networks comprising hundreds of millions of connection nodes. Processors can also comprise a multicore processor, a physics processing unit (PPU), a digital signal processor (DSP), a network processor, or some other suitable type of processor. Further processors 230 can be homogenous or heterogeneous. For example, processors 230 can be central processing units. In another example, processors 230 can be a mix of central processing units and graphical processing units.

Predictive program 202 comprises modality router 206, neural extractor 208, task router 210, and neural predictor 212. In this illustrative example, the predictive program 202 is implemented with the machine intelligence 204 by using machine learning 216 and predictive algorithm 218.

The modality router 206 is an application program that receives the input 224 from the database 220, determines the type of data for input 224, and routes the input 224 to an appropriate neural extractor of neural extractors 208 based on the data type or characteristic of the input 224. Input 224 might carry a data-modality tag, allowing the logic in modality router 206 to forward the data to the right processor. Alternatively, input 224 might not include a data-modality tag, in which case the machine intelligence 204 might use a classification model trained by historical inputted data to determine the data type of input 224 and route it accordingly.

The modality router 206 is in communication with the neural extractors 208. Once the input 224 has been routed to the appropriate neural extractor of neural extractors 208 based on the data type, each neural extractor of neural extractors 208 is configured to compress input 224 and extract the latent representation 228 from input 224. In this manner, each neural extractor of neural extractors 208 are trained by the machine intelligence 204 to deal with a particular type of data, therefore making the latent representation process more efficient and comprehensive. In this illustrative example, the neural extractors 208 might use different machine learning methods to extract latent representation 228 from input 224. For example, if input 224 is a structured input, the neural extractor might implement a fully connected neural network or a recurrent neural network to extract the latent representation. Alternatively, if input 224 is a non-structured input, the neural extractor might use a convolutional neural network and a transformer-based machine learning model for extraction of latent representation.

Predictive program 202 further includes a task router 210 in communication with the neural extractors 208. In this illustrative example, the task router 210 directs the extracted latent representations from neural extractors 208 to the correct neural predictor of neural predictors 212 for further analysis. Here, each input data type is directed to a modality-specific neural predictor. In this illustrative example, when multiple input data types are involved, there will be an additional neural predictor for the combination of the different data types. For example, if the inputs include HR profiles and payroll transactions, there will be one neural predictor for the HR profile, one neural predictor for the payroll transactions, and one neural predictor for the combination of HR profiles and payroll transactions.

The neural predictors 212 then make a prediction based on the latent representation 228 from input 224 and combine all predictions made for inputs 222 to generate an output 214.

There are three main categories of machine learning: supervised, unsupervised, and reinforcement learning.

Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Whereas supervised and unsupervised methods learn from a dataset, reinforcement learning methods learn from feedback to re-learn/retrain the models. Algorithms are used to train the predictive model through interacting with the environment using measurable performance criteria.

Figures 3, 4:
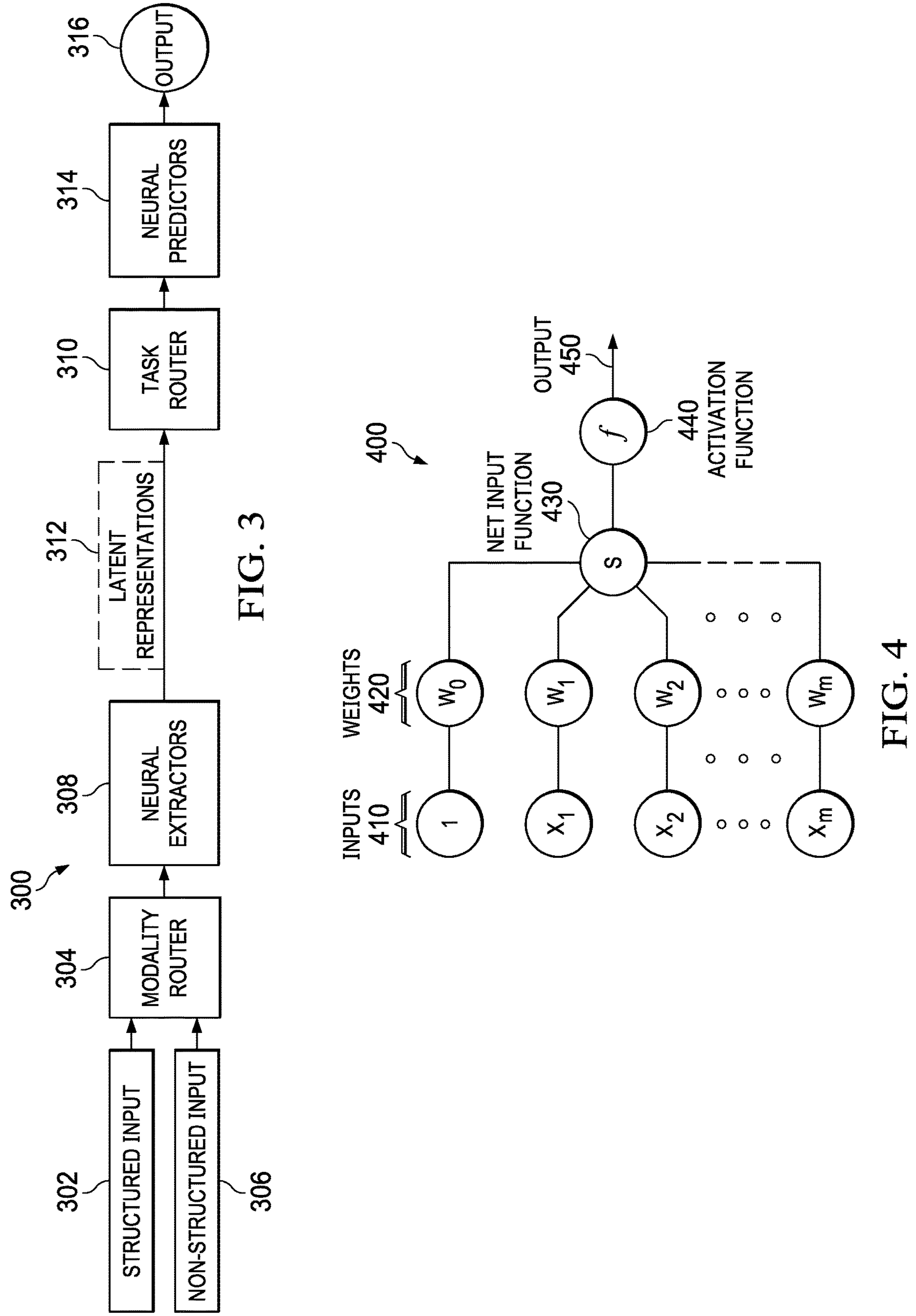
FIG. 3 depicts a block diagram illustrating a data flow for multi-modal predictive modeling in accordance with an illustrative embodiment.
FIG. 4 is a diagram that illustrates a node in a neural network in which illustrative embodiments can be implemented.

FIG. 3 depicts a block diagram illustrating a data flow for multi-modal predictive modeling in accordance with an illustrative embodiment. Data flow 300 may be implemented in multi-modal deep learning system 200 in FIG. 2.

The data flow 300 starts by receiving structured input 302 and non-structured input 306 from a database. In this illustrative example, the structured input 302 and the non-structured input 306 are received by a modality router 304. The modality router 304 then sends the structured input 302 and non-structured input 306 to the appropriate neural extractors 308 based on the data type of the input. Each neural extractor from the neural extractors 308 are specialized to extract the latent representations 312 from input of certain data types. The task router 310 directs the latent representations 312 to the appropriate neural predictors 314 when the latent representations 312 are extracted by neural extractors 308. The neural predictors 314 then analyzes the extracted latent representations 312 and generate an output 316. Output 316 may be any suitable analysis output related to business operations. For example, the output 316 can be an earning code classification, job level prediction, business function classification, or customer demand prediction. In this illustrative example, a loss function can be used to optimize output 316 based on the analysis performed. For example, a cross-entropy loss function can be used for classification (e.g., earning code, job level, business function). Regression value-based losses such as mean square error or mean absolute error can be used for regression. The complex losses such as the mixture of cross-entropy loss and negative likelihood losses can be used for the multi-task losses, such as for customer demand prediction.

FIG. 4 is a diagram that illustrates a node in a neural network in which illustrative embodiments can be implemented. Node 400 might comprise part of machine intelligence 204 in FIG. 2. Node 400 combines multiple inputs 410 from other nodes. Each input 410 is multiplied by a respective weight 420 that either amplifies or dampens that input, thereby assigning significance to each input for the task the algorithm is trying to learn. The weighted inputs are collected by a net input function 430 and then passed through an activation function 440 to determine the output 450. The connections between nodes are called edges. The respective weights of nodes and edges might change as learning proceeds, increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Figure 5:
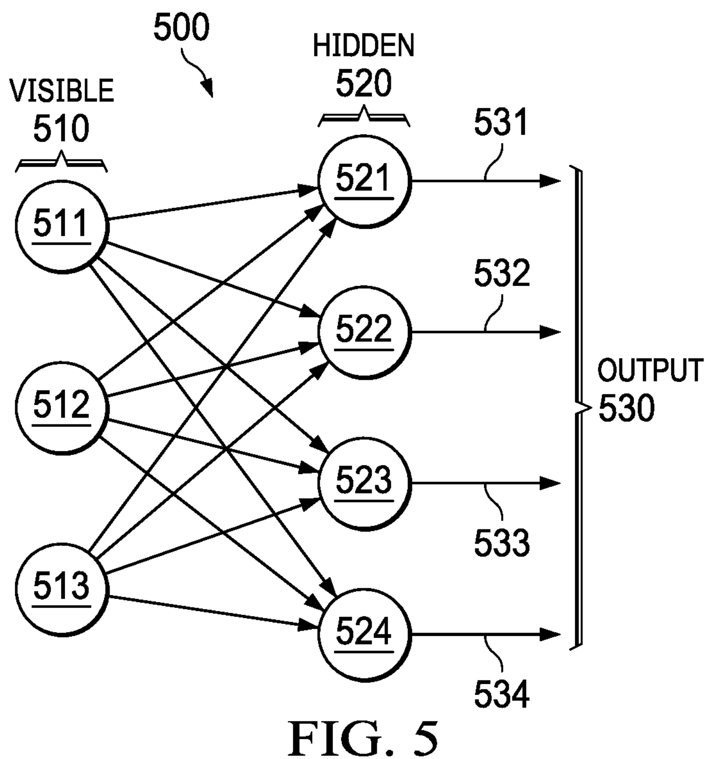
FIG. 5 is a diagram illustrating a full connected neural network in which illustrative embodiments can be implemented.

FIG. 5 is a diagram illustrating a neural network in which illustrative embodiments can be implemented. Neural network 500 might comprise part of machine intelligence 204 in FIG. 2 and is comprised of a number of nodes, such as node 400 in FIG. 4. As shown in FIG. 5, the nodes in the neural network 500 are divided into a layer of visible nodes 510, a layer of hidden nodes 520, and a layer of output nodes 530. Neural network 500 is an example of a fully connected neural network (FCNN) in which each node in a layer is connect to all of the nodes in an adjacent layer, but nodes within the same layer share no connections.

The visible nodes 510 are those that receive information from the environment (i.e. a set of external training data). Each visible node in layer 510 takes a low-level feature from an item in the dataset and passes it to the hidden nodes in the next layer 520. When a node in the hidden layer 520 receives an input value x from a visible node in layer 510 it multiplies x by the weight assigned to that connection (edge) and adds it to a bias b. The result of these two operations is then fed into an activation function which produces the node's output.

For example, when node 521 receives input from all of the visible nodes 511-513 each x value from the separate nodes is multiplied by its respective weight, and all of the products are summed. The summed products are then added to the hidden layer bias, and the result is passed through the activation function to produce output 531. A similar process is repeated at hidden nodes 522-524 to produce respective outputs 532-534. In the case of a deeper neural network, the outputs 530 of hidden layer 520 serve as inputs to the next hidden layer.

The output 530 is used to output density parameters. For example, the mean and variance for the Gaussian distribution. Usually, the FCNN is used to produce classification labels or regression values. However, the illustrative embodiments use it directly to produce the distribution parameters, which can be used to estimate the likelihood/probability of output events/time. The illustrative embodiments use the FCNN to output distribution parameters, which are used to generate the bundle change event and/or event-change-time (explained below).

Training a neural network is conducted with standard mini-batch stochastic gradient descent-based approaches, where the gradient is calculated with the standard back-propagation procedure. In addition to the neural network parameters, which need to be optimized during the learning procedure, there are weights for different distributions, which also need to be optimized based on the underlying dataset. Since the weights are non-negative, they are mapped to the range [0,1] while simultaneously requiring them summed to be 1.

In machine learning, a cost function estimates how the model is performing. It is a measure of how wrong the model is in terms of its ability to estimate the relationship between input x and output y. This is expressed as a difference or distance between the predicted value and the actual value. The cost function (i.e. loss or error) can be estimated by iteratively running the model to compare estimated predictions against known values of y during supervised learning. The objective of a machine learning model, therefore, is to find parameters, weights, or a structure that minimizes the cost function.

Gradient descent is an optimization algorithm that attempts to find a local or global minima of a function, thereby enabling the model to learn the gradient or direction that the model should take in order to reduce errors. As the model iterates, it gradually converges towards a minimum where further tweaks to the parameters produce little or zero changes in the loss. At this point the model has optimized the weights such that they minimize the cost function.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Neural networks can be stacked to create deep networks. After training one neural net, the activities of its hidden nodes can be used as input training data for a higher level, thereby allowing stacking of neural networks. Such stacking makes it possible to efficiently train several layers of hidden nodes.

A recurrent neural network (RNN) is a type of deep neural network in which the nodes are formed along a temporal sequence. RNNs exhibit temporal dynamic behavior, meaning they model behavior that varies over time.

Figure 6:
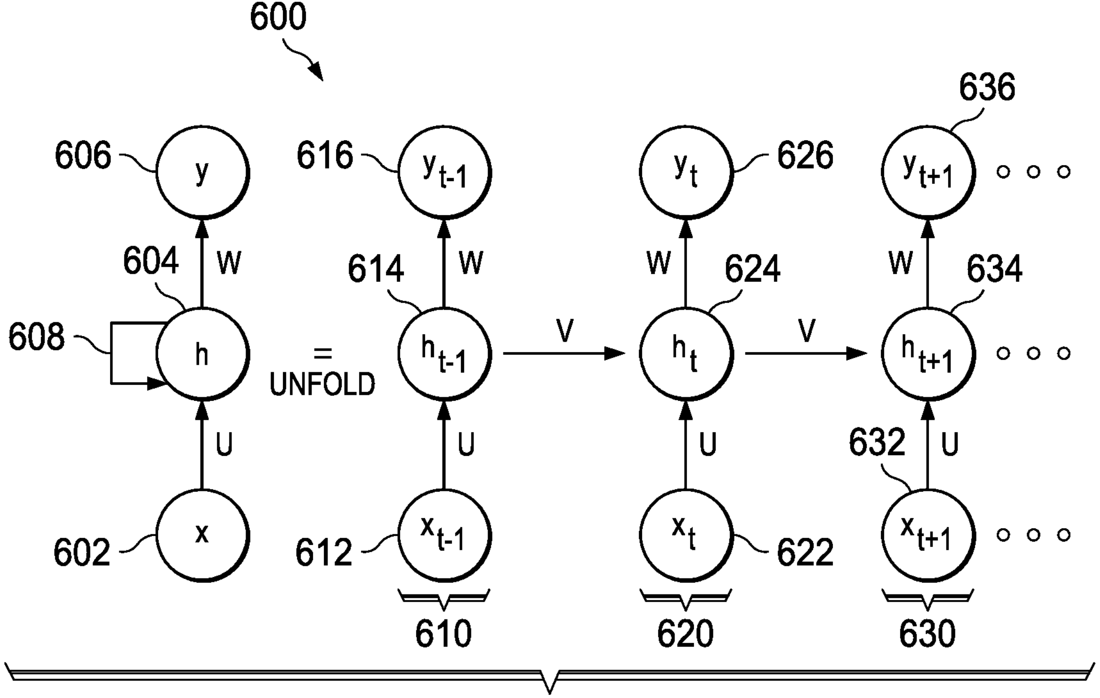
FIG. 6 illustrates an example of a recurrent neural network in which illustrative embodiments can be implemented.

FIG. 6 illustrates an example of a recurrent neural network in which illustrative embodiments can be implemented. RNN 600 might comprise part of machine intelligence 204 in FIG. 2. RNNs are recurrent because they perform the same task for every element of a sequence, with the output being dependent on the previous computations. RNNs can be thought of as multiple copies of the same network, in which each copy passes a message to a successor. Whereas traditional neural networks process inputs independently, starting from scratch with each new input, RNNs persistence information from a previous input that informs processing of the next input in a sequence.

RNN 600 comprises an input vector 602, a hidden layer 504, and an output vector 606. RNN 600 also comprises loop 608 that allows information to persist from one input vector to the next. RNN 600 can be "unfolded" (or "unrolled") into a chain of layers, e.g., 610, 620, 630 to write out the network 600 for a complete sequence. Unlike a traditional neural network, which uses different weights at each layer, RNN 600 shares the same weights U, W, V across all steps. By providing the same weights and biases to all the layers 610, 620, 630, RNN 600 converts the independent activations into dependent activations.

The input vector 612 at time step t−1 is $x_{t-1}$. The hidden state $h_{t-1}$ 614 at time step t−1, which is required to calculate the first hidden state, is typically initialized to all zeroes. The output vector 616 at time step t−1 is $y_{t-1}$ Because of persistence in the network, at the next time step t, the state $h_t$ of the hidden layer 624 is calculated based on the previous hidden state $h_{t-1}$ 614 and the new input vector $x_t$ 622. The hidden state $h_t$ acts as the "memory" of the network. Therefore, output $y_t$ 626 at time step t depends on the calculation at time step t−1. Similarly, output $y_{t+1}$ 636 at time step t+1 depends on hidden state $h_{t+1}$ 634, calculated from hidden state $h_t$ 624 and input vector $x_{t+1}$ 632.

There are several variants of RNNs such as "vanilla" RNNs, Long Short-Term Memory (LSTM), Gated Recurrent Unit (GRU), and others with which the illustrative embodiments can be implemented. By employing an RNN, the illustrative embodiments are able to model prediction for different types of data over time.

Figure 7:
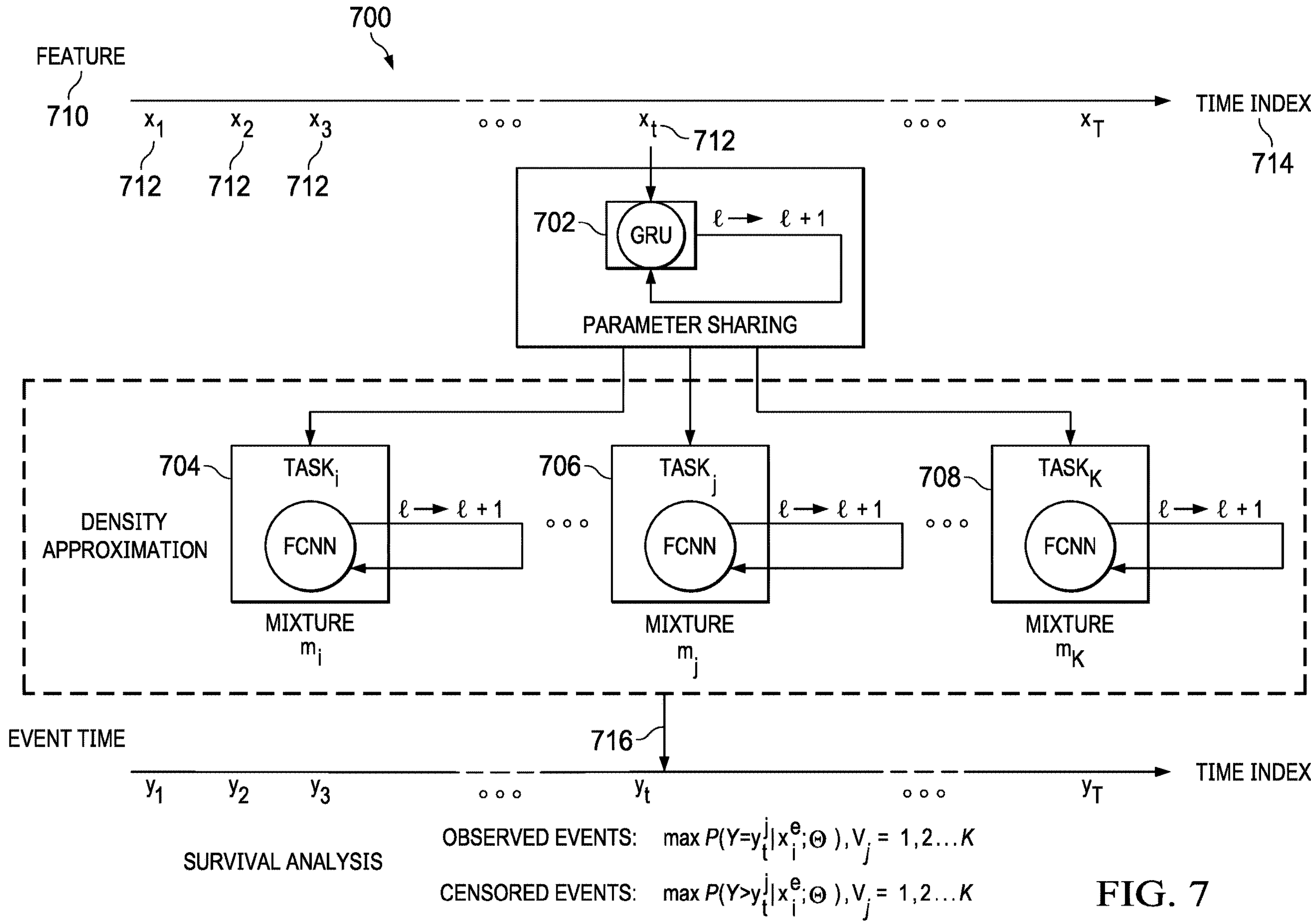
FIG. 7 depicts a multimodal, multi-task deep learning architecture in accordance with illustrative embodiments.

FIG. 7 depicts a multimodal, multi-task deep learning architecture in accordance with illustrative embodiments. Deep learning architecture 700 can be implemented through a combination of RNN 600 in FIG. 6 and FCNN 500 in FIG. 5. Deep learning architecture 700 might be an example implementation of machine intelligence 204 in FIG. 2 and used in data flow 300 in FIG. 3.

Deep learning architecture 700 comprises RNN 702 and three FCNN layer groups 704, 706, 708. By using multiple FCNN layer groups 704, 706, 708 on top of the RNN 702 layers, deep learning architecture 700 can approximate the density (distribution) of an event time. In particular, RNN 702 outputs the density parameters (e.g., mean and variance for the Gaussian distribution, or scale and shape parameters for the Weibull distribution). One simple distribution might not fit the underlying data very well. Therefore, illustrative embodiments can use a weighted combination of basis distributions to form the final output distribution. For the combination method, the illustrative embodiments can use the arithmetic average or geometric average. Once the density parameters are induced/outputted, the probability or density function for any given time can be computed, which is how the labeled sequence is used to compute the likelihood (or losses) to do backpropagation.

Input into deep learning architecture 700 comprises dynamic feature values 710 extracted at different time stamps $x_1$, $x_2$, $x_3$, $x_t$ 712 along a time index 714. The time intervals between timestamps 712 might be daily, weekly, monthly, etc.

The whole dataset used by RNN 702 represents changes across all types of data within a time period. Each output only indicates a predicted change for a particular type of data based on the observed data. However, prediction and inference of future change for a given customer relies both on past behavior of that customer as well as change behavior of similar customers (defined by shared static features). Therefore, the prediction output is an intelligent decision encoded with all changes across all events in the dataset.

In an illustrative embodiment, RNN 702 might comprise three layers (not shown). However, more layers can be used if needed. Each layer feeds into the next (similar to that shown in FIG. 6), denoted $l \rightarrow l+1$ in FIG. 7. Within each RNN layer, the output of the previous timestamp is used as input for the next timestamp in the temporal sequence.

Deep learning architecture 700 comprises a separate FCNN layer group for each type of data. In this illustrative example, there are three types of data. Therefore, there are three FCNN layer groups 704, 706, 708, one for each type of data. Each FCNN might comprise multiple fully connected layers, as shown for example in FIG. 5.

RNN 702 shares all predicted change events (upgrade, downgrade, termination) to learn common representation. Then for each type of change event, an independent FCNN is used to learn how to make the prediction. A density/distribution modeling/approximation is attached to each FCNN group 704, 706, 708. Specifically, density will output the density parameter(s). Using FCNN group 704 as an example, assuming the output time sequence from RNN 702 follows the normal distribution, which has a mean parameter and a variance parameter, FCNN 704 can compute any probability density/distribution function or likelihood given any test time.

The final output vector 716 comprises a mixture of multiple distributions to determine the time-to-event prediction (survival analysis) that captures the event information. In addition to a normal distribution there might also be Weibull distribution, an exponential distribution, etc. These probability density functions are combined together to produce one final weighted average. Each distribution will have a weight, which is determined automatically during the learning stage. The weighting is for each data type. Using the example above, for FCNN 704 there will be multiple distributions attached with different weights. For FCNN 706, there will be a similar kind of mixture behavior, as well as with FCNN 708.

Figure 8:
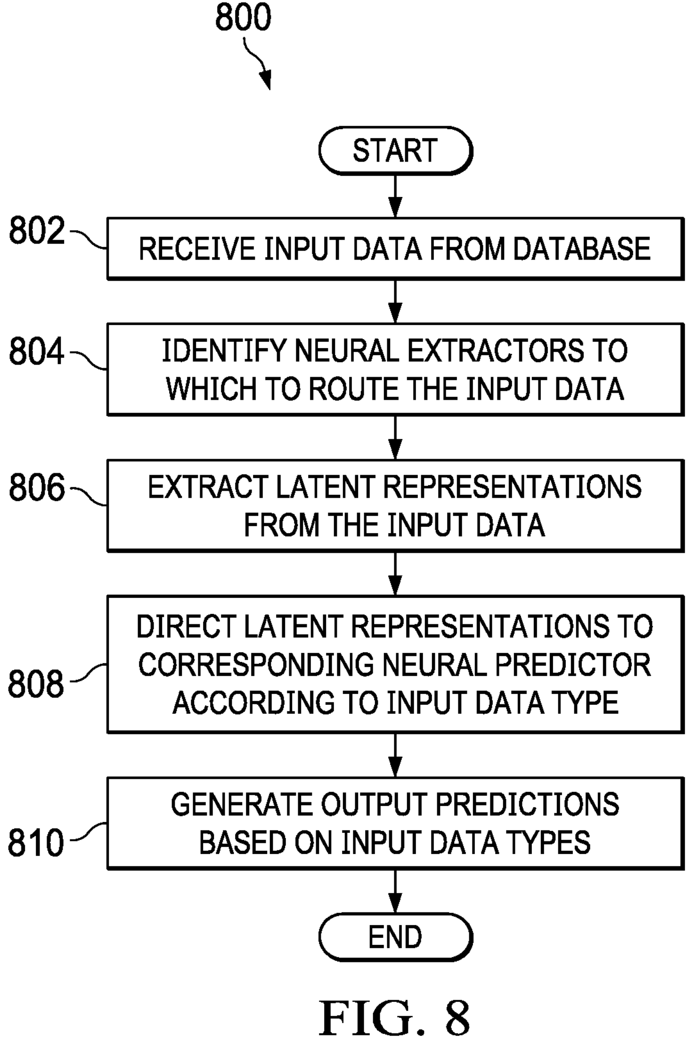
FIG. 8 depicts a flowchart illustrating a process for machine learning in accordance with illustrative embodiments.

FIG. 8 depicts a flowchart illustrating a process for machine learning in accordance with illustrative embodiments. Process 800 can be implemented in hardware, software, or both. When implemented in software, the process can take the form of program code that is run by one of more processor units located in one or more hardware devices in one or more computer systems. Process 800 may be implemented in multi-modal deep learning system 200 in FIG. 2 and might be an example of data flow 300 in FIG. 3.

Process 800 begins with receiving input data from a database, wherein the input data comprises different data types (step 802). The input data may comprise structured data or non-structured data. The input data may comprise at least one of human resources profiles, service calls, or historical payroll transactions.

Responsive to receiving the input data, process 800 identifies a number of corresponding neural extractors to which to route the input data according to data type (step 804). Each neural extractor may be specialized in extracting latent representations from a specific data type. A modality router may identify the neural extractors to which to route the input data. The neural extractors then extract, via a number of machine learning models, the latent representations from the input data (step 806). Structured input may be fed into machine learning models comprising a fully connected neural network and a recurrent neural network. Non-structured input may be fed into machine learning models comprising a convolutional neural network and a transformer-based machine learning model.

Process 800 directs the latent representations to a number of corresponding neural predictors, wherein each input data type is directed to a modality-specific neural predictor (step 808). If predictions are to be made for combinations of different input data types, corresponding neural predictors are used for the specific combinations of input data types in question.

The neural predictors then generate a number of output predictions for each input data type based on the latent representations (step 810). The neural predictors may also generate output predictions for combinations of different input data types. The output predictions may comprise at least one of earning code classification, job level prediction, business function classification, or customer demand prediction.

Process 800 terminates thereafter.

Figure 9:
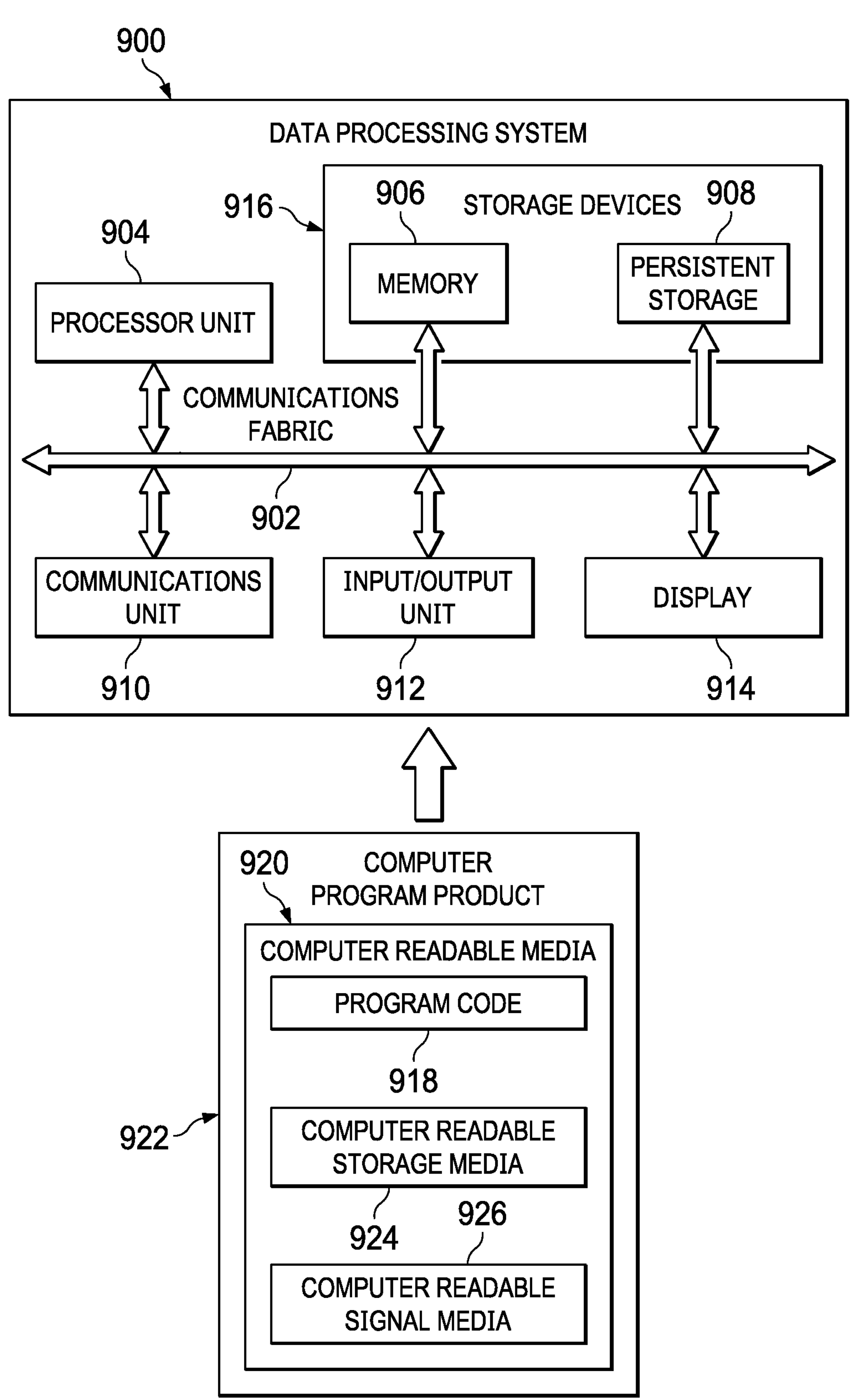
FIG. 9 is an illustration of a block diagram of a data processing system in accordance with an illustrative embodiment.

Turning now to FIG. 9, an illustration of a block diagram of a data processing system is depicted in accordance with an illustrative embodiment. Data processing system 900 may be used to implement one or more computers and client computers 112 in FIG. 1. In this illustrative example, data processing system 1000 includes communications framework 902, which provides communications between processor unit 904, memory 906, persistent storage 908, communications unit 910, input/output unit 912, and display 914. In this example, communications framework 902 may take the form of a bus system.

Processor unit 904 serves to execute instructions for software that may be loaded into memory 906. Processor unit 1004 may be a number of processors, a multi-processor core, or some other type of processor, depending on the particular implementation. In an embodiment, processor unit 904 comprises one or more conventional general-purpose central processing units (CPUs). In an alternate embodiment, processor unit 904 comprises one or more graphical processing units (CPUs).

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908. Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer-usable program code, or computer-readable program code that may be read and executed by a processor in processor unit 904. The program code in the different embodiments may be embodied on different physical or computer-readable storage media, such as memory 906 or persistent storage 908.

Program code 918 is located in a functional form on computer-readable media 920 that is selectively removable and may be loaded onto or transferred to data processing system 900 for execution by processor unit 904. Program code 918 and computer-readable media 920 form computer program product 922 in these illustrative examples. In one example, computer-readable media 1020 may be computer-readable storage media 924 or computer-readable signal media 926.

In these illustrative examples, computer-readable storage media 924 is a physical or tangible storage device used to store program code 918 rather than a medium that propagates or transmits program code 918. Alternatively, program code 918 may be transferred to data processing system 900 using computer-readable signal media 926.

Computer-readable signal media 926 may be, for example, a propagated data signal containing program code 918. For example, computer-readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for multi-modal deep learning, the method comprising:

receiving, by one or more processors, coupled with memory, input data from a database, wherein the input data comprises different data types, and wherein at least a portion of the input data is displayed via a display device;

responsive to receiving the input data, routing, by the one or more processors, the input data to a plurality of neural extractors based on the different data types, wherein a first neural extractor of the plurality of neural extractors is trained to extract a first latent representation from a first data type of the different data types and a second neural extractor is trained to extract a second latent representation from a second data type of the different data types, wherein the first data type corresponds to structured data and the second data type corresponds to unstructured data;

extracting, by the one or more processors, via one or more machine learning models, the first latent representation from the structured data using the first neural extractor and the second latent representation from the unstructured data using the second neural extractor;

routing, by the one or more processors, (i) the first latent representation to a first modality-specific neural predictor, (ii) the second latent representation to a second modality-specific neural predictor, and (iii) a combination of the first latent representation and the second latent representation to at least one neural predictor trained on a combination of the first data type and the second data type;

generating, by the one or more processors, using the first modality-specific neural predictor, the second modality-specific neural predictor, and the at least one neural predictor trained on the combination of the first data type and the second data type, a plurality of output predictions corresponding to the first data type, the second data type, and the combination of the first data type and the second data type; and transmitting, by the one or more processors, to a client device, data to cause the client device to display the plurality of output predictions.

2. The method of claim 1, wherein a modality router identifies the plurality of neural extractors to which to route the input data according to the different data types.

3. The method of claim 1, wherein structured input are fed into machine learning models comprising a fully connected neural network and a recurrent neural network.

4. The method of claim 1, wherein non-structured input are fed into machine learning models comprising a convolutional neural network and a transformer-based machine learning model.

5. The method of claim 1, wherein the input data comprise at least one of:

human resources profiles;

service calls; or historical payroll transactions.

6. The method of claim 1, wherein the plurality of output predictions comprises at least one of an:

earning code classification;

job level prediction;

business function classification; or customer demand prediction.

7. A system for multi-modal deep learning, the system comprising:

a storage device configured to store program instructions; and one or more processors operably connected to the storage device and configured to execute the program instructions to cause the system to:

receive input data from a database, wherein the input data comprises different data types, and wherein at least a portion of the input data is displayed via a display device;

responsive to receiving the input data, route the input data to a plurality of neural extractors based on the different data types, wherein a first neural extractor of the plurality of neural extractors is trained to extract a first latent representation from a first data type of the different data types and a second neural extractor is trained to extract a second latent representation from a second data type of the different data types, wherein the first data type corresponds to structured data and the second data type corresponds to unstructured data;

extract, neural extractors via one or more machine learning models, the first latent representation from the structured data using the first neural extractor and the second latent representation from the unstructured data using the second neural extractor;

route (i) the first latent representation to a first modality-specific neural predictor, (ii) the second latent representation to a second modality-specific neural predictor, and (ii ii) a combination of the first latent representation and the second latent representation to at least one neural predictor trained on a combination of the first data type and the second data type;

generate, using the first modality-specific neural predictor, the second modality-specific neural predictor, and the at least one neural predictor trained on the combination of the first data type and the second data type, a plurality of output predictions corresponding to the first data type, the second data type, and the combination of the first data type and the second data type; and transmit, to a client device, data to cause the client device to display the plurality of output predictions.

8. The system of claim 7, wherein a modality router identifies the plurality of neural extractors to which to route the input data according to the different data types.

9. The system of claim 7, wherein structured input are fed into machine learning models comprising a fully connected neural network and a recurrent neural network.

10. The system of claim 7, wherein non-structured input are fed into machine learning models comprising a convolutional neural network and a transformer-based machine learning model.

11. The system of claim 7, wherein the input data comprise at least one of:

human resources profiles;

service calls; or historical payroll transactions.

12. The system of claim 7, wherein the plurality of output predictions comprises at least one of an:

earning code classification;

job level prediction;

business function classification; or customer demand prediction.

13. A computer program product for multi-modal deep learning, the computer program product comprising:

a computer-readable storage medium having program instructions embodied thereon to perform the steps of:

receiving input data from a database, wherein the input data comprises different data types, and wherein at least a portion of the input data is displayed via a display device;

responsive to receiving the input data, routing the input data to a plurality of neural extractors based on the different data types, wherein a first neural extractor of the plurality of neural extractors is trained to extract a first latent representation from a first data type of the different data types and a second neural extractor is trained to extract a second latent representation from a second data type of the different data types, wherein the first data type corresponds to structured data and the second data type corresponds to unstructured data;

extracting, via one or more machine learning models, the first latent representation from the structured data using the first neural extractor and the second latent representation from the unstructured data using the second neural extractor;

routing (i) the first latent representation to a first modality-specific neural predictor, (ii) the second latent representation to a second modality-specific neural predictor, and (iii) a combination of the first latent representation and the second latent representation to at least one neural predictor trained on a combination of the first data type and the second data type;

generating, using the first modality-specific neural predictor, the second modality-specific neural predictor, and the at least one neural predictor trained on the combination of the first data type and the second data type, a plurality of output predictions corresponding to the first data type, the second data type, and the combination of the first data type and the second data type; and transmitting, to a client device, data to cause the client device to display the plurality of output predictions.

14. The computer program product of claim 13, wherein a modality router identifies the plurality of neural extractors to which to route the input data according to the different data types.

15. The computer program product of claim 13, wherein structured input are fed into machine learning models comprising a fully connected neural network and a recurrent neural network.

16. The computer program product of claim 13, wherein non-structured input are fed into machine learning models comprising a convolutional neural network and a transformer-based machine learning model.

17. The computer program product of claim 13, wherein the input data comprise at least one of:

human resources profiles;

service calls; or historical payroll transactions.

18. The computer program product of claim 13, wherein the plurality of output predictions comprises at least one of an:

earning code classification;

job level prediction;

business function classification; or customer demand prediction.

* * * * *